(12) United States Patent
Pan

(10) Patent No.: US 7,538,922 B2
(45) Date of Patent: May 26, 2009

(54) ENCAPSULATED SPATIAL LIGHT MODULATOR HAVING IMPROVED PERFORMANCE

(75) Inventor: Shaoher X. Pan, San Jose, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 8 days.

(21) Appl. No.: 11/690,776

(22) Filed: Mar. 23, 2007

(65) Prior Publication Data

US 2008/0231938 A1 Sep. 25, 2008

(51) Int. Cl.
*G02B 26/08* (2006.01)
*G02B 26/00* (2006.01)

(52) U.S. Cl. .................. 359/198; 359/225; 359/290

(58) Field of Classification Search .................. 359/198, 359/224, 225, 290–292, 295, 298, 318, 320
See application file for complete search history.

(56) References Cited

U.S. PATENT DOCUMENTS 6,284,342 B1 9/2001 Ebisawa et al.
6,992,810 B2 1/2006 Pan et al.
7,042,623 B1 * 5/2006 Huibers et al. .............. 359/291
7,167,298 B2 1/2007 Pan

OTHER PUBLICATIONS

Gabriel Matus et al., "Fabricating Tall Micro Structures", U.S. Appl. No. 11/680,600, filed on Feb. 28, 2007, 34 pp.
Shaoher X. Pan, "Simplified Manufacturing Process for Micro Mirrors", U.S. Appl. No. 11/564,040, filed on Nov. 28, 2006, 40 pp.

* cited by examiner

*Primary Examiner*—William C Choi
(74) *Attorney, Agent, or Firm*—Fish & Richardson P.C.

(57) ABSTRACT

Devices and methods for forming a spatial light modulator with high contrast are described. Light absorbing materials are used within a chamber that houses a spatial light modulator. The light absorbing materials absorb reflected light that is not intended for forming a part of a display image. The light absorbing material can form an aperture layer, wherein light to form the display image is transmitted through an opening in the aperture layer. An array of spatial light modulators can be within the housing and dummy spatial light modulators may be formed to enable easy alignment of the array with the opening in the aperture layer.

35 Claims, 14 Drawing Sheets

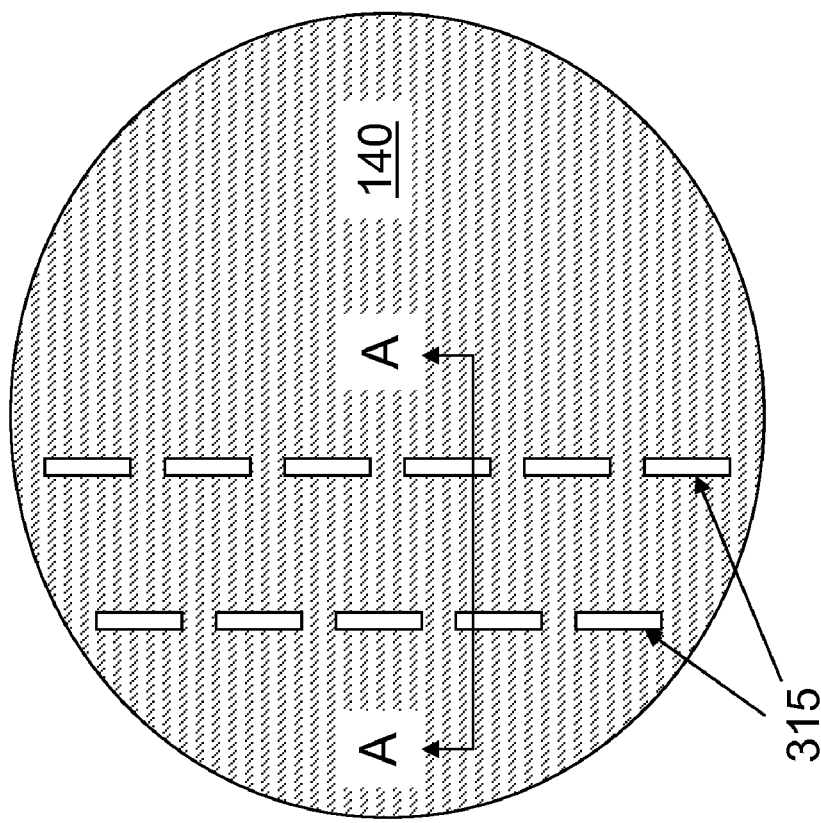

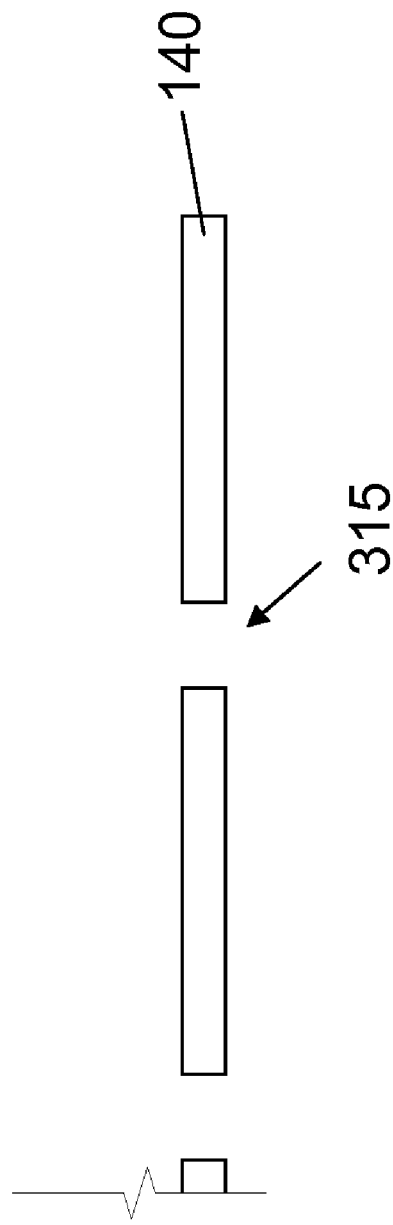
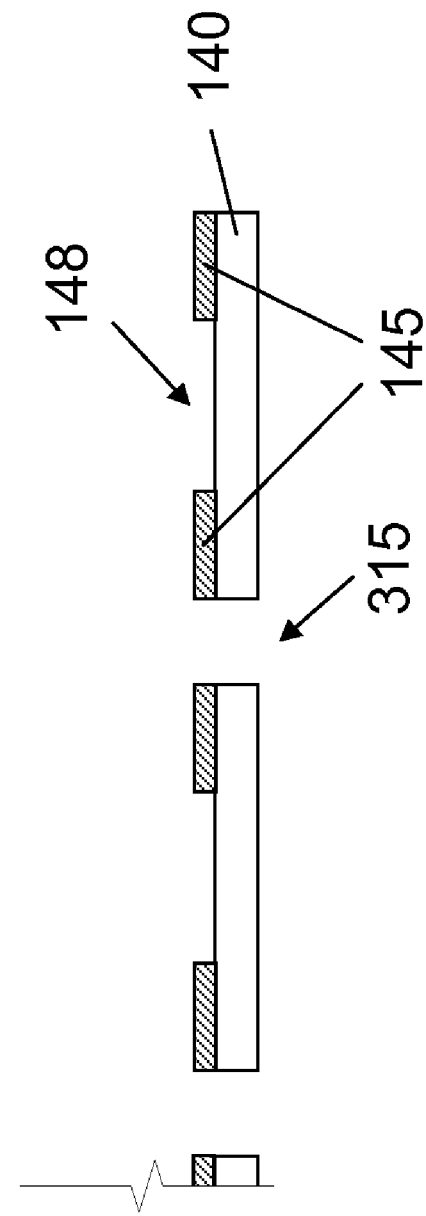

ENCAPSULATED SPATIAL LIGHT MODULATOR HAVING IMPROVED PERFORMANCE

BACKGROUND

The present disclosure relates to the packaging of spatial light modulators.

In manufacturing spatial light modulators, multiple spatial light modulators are commonly fabricated on a semiconductor wafer. The spatial light modulators are then sealed in micro chambers, and subsequently separated into individual dies. The micro chambers typically include transparent windows through which the spatial light modulators to receive and output optical signals. To ensure the optical performance of the spatial light modulators, it is important to prevent unwanted scattered light in the micro chambers from exiting the transparent window.

SUMMARY

In one general aspect, an encapsulated spatial light modulator (SLM) is described. The SLM includes a spatial light modulator on a substrate within a chamber, an encapsulation cover in part defining the chamber, a spacer wall between the substrate and the encapsulation cover, wherein the spacer wall has an inner surface adjacent to the spatial light modulator; and a first light absorbing material on the inner surface of the spacer wall, the light absorbing material configured to absorb light in the chamber.

In another general aspect, methods for operating an array of tiltable mirrors encapsulated in a chamber on a substrate are described. A method can include the following steps. At least one of the tiltable mirrors is tilted to an on position. A first packet of incident light is reflected off of the tiltable mirror to produce a first reflected light in the on position. The first reflected light is transmitted out of the chamber, wherein the chamber comprises an encapsulation cover and a spacer wall between the substrate and the encapsulation cover. The tiltable mirror is tilted to an off position. A second packet of incident light is reflected off of the tiltable mirror to produce a second reflected light in the off position. The second reflected light is absorbed by a first light absorbing material on a surface of the spacer wall in the chamber.

In another yet general aspect, methods of fabricating an encapsulation device for a plurality of spatial light modulators are described. The methods can include the following steps. A plurality of openings are formed in an encapsulation cover. An aperture layer is formed on the encapsulation cover, the aperture layer comprising a plurality of openings. Spacer walls are formed on the encapsulation cover. A layer of a first light absorbing material is formed on the spacer walls and the aperture layer, thereby producing an encapsulation device, wherein the first light absorbing material is configured to absorb light in the chambers.

Implementations of the system may include one or more of the following features. The encapsulation cover can be transparent to visible, UV, or IR light. The first light absorbing material can include a zirconium compound, such as zirconium oxide or zirconium nitride. The device can include an aperture layer on a surface of the encapsulation cover, wherein the aperture layer has an opening over the spatial light modulator. The aperture layer can include a metal oxide or carbide, such as a chromium compound. The aperture layer can be inside the chamber. The SLM can include a second light absorbing material on a surface of the aperture layer, wherein the second light absorbing material is configured to absorb light in the chamber. The second light absorbing material can include a chromium compound or a zirconium compound. The SLM can include a third light absorbing material on a surface of the substrate, wherein the third light absorbing material is configured to absorb unwanted light in the chamber. The third light absorbing material can include a zirconium compound. The third light absorbing material can be on a portion of the surface of the substrate not covered by the spatial light modulator. The spacer wall can include a metallic material. The spacer wall can be sealed to the encapsulation cover or the substrate with an adhesive. The spacer wall can be bonded to the encapsulation cover or the substrate. The spacer wall can define a cavity height between the substrate and the encapsulation cover, and the cavity height can be between about 0.2 and 2.0 microns, such as between 0.5 and 1 micron. The spatial light modulator can include a tiltable mirror configured to tilt to an on position and an off position. The tiltable mirror can be configured to reflect light out of the chamber when the tiltable mirror is at the on position. The encapsulation cover can be substantially parallel to a surface of the substrate and the mirror and reflect light in an on direction when the mirror is at the on position and the on direction is substantially perpendicular to the encapsulation cover. The tiltable mirror can be configured to reflect light toward the first light absorbing material when the tiltable mirror is at the off position, wherein reflected light is absorbed by the first light absorbing material. The SLM can also include electric contacts on the substrate, where the one or more electric contacts are configured to send electric signals to or receive electric signals from the spatial light modulator. The electric contacts can be positioned outside of the chamber. The SLM can include an aperture layer on a surface of the encapsulation cover, and the SLM can include an array of tiltable mirrors where the array is characterized by a first lateral dimension and a second lateral dimension substantially orthogonal to the first dimension, and the aperture layer comprises an opening above the array of tiltable mirrors. The first lateral dimension of the array of tiltable mirrors can be wider than a corresponding dimension of the opening in the aperture layer.

The spacer wall can be formed by forming a conductive layer on the encapsulation cover, forming a mask layer on the conductive layer, wherein the mask layer comprises a plurality of openings and electroplating the spacer walls on the conductive layer and in the openings of the mask layer. The step of forming a layer of a first light absorbing material can include the following steps: coating a photo resist layer on the spacer walls, the aperture layer, and on a surface of the encapsulation cover that corresponds to the openings in the aperture layer; irradiating a portion of the photo resist layer that is in the openings of the aperture layer; removing the photo resist layer on the spacer walls and the aperture layer; subsequently depositing the first light absorbing material on the spacer walls and the aperture layer, and on the photo resist layer; and removing the photo resist layer on the surface of the encapsulation cover and the first light absorbing material thereon. The spacer walls of the encapsulation device can subsequently be connected to a surface of a substrate having a plurality of spatial light modulators to form a plurality of chambers on the substrate with each chamber including at least one spatial light modulator. The spacer walls can be sealed to the surface of the substrate by an adhesive or bonded to the surface by plasma bonding. A portion of the substrate and a portion of the encapsulation cover can be cut to form two or more dies each containing at least one chamber encapsulating one of the spatial light modulators.

Various implementations of the methods and devices described herein may include one or more of the following advantages. The disclosed spatial light modulators can have improved optical performance. Unwanted light may be absorbed in a micro chamber that encapsulates the spatial light modulator. The optical noise in the output optical signal can therefore be reduced. The contrast between an "on" state and an "off" state of the spatial light modulator may also be increased. The specification also discloses manufacturing processes for encapsulation devices that include light absorbing components that can absorb the unwanted light in the chambers. Furthermore, a plurality of spatial light modulators on a substrate can be encapsulated in a common process. The manufacturing efficiency is thus improved.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles, devices and methods described herein.

FIG. 6 is a top view of an encapsulation cover assembly.

FIGS. 7A-7I are cross-sectional views along A-A in FIG. 6, showing the steps of fabricating an encapsulation device and encapsulating a spatial light modulator on a substrate using the encapsulation device.

DETAILED DESCRIPTION

Figure 1A:
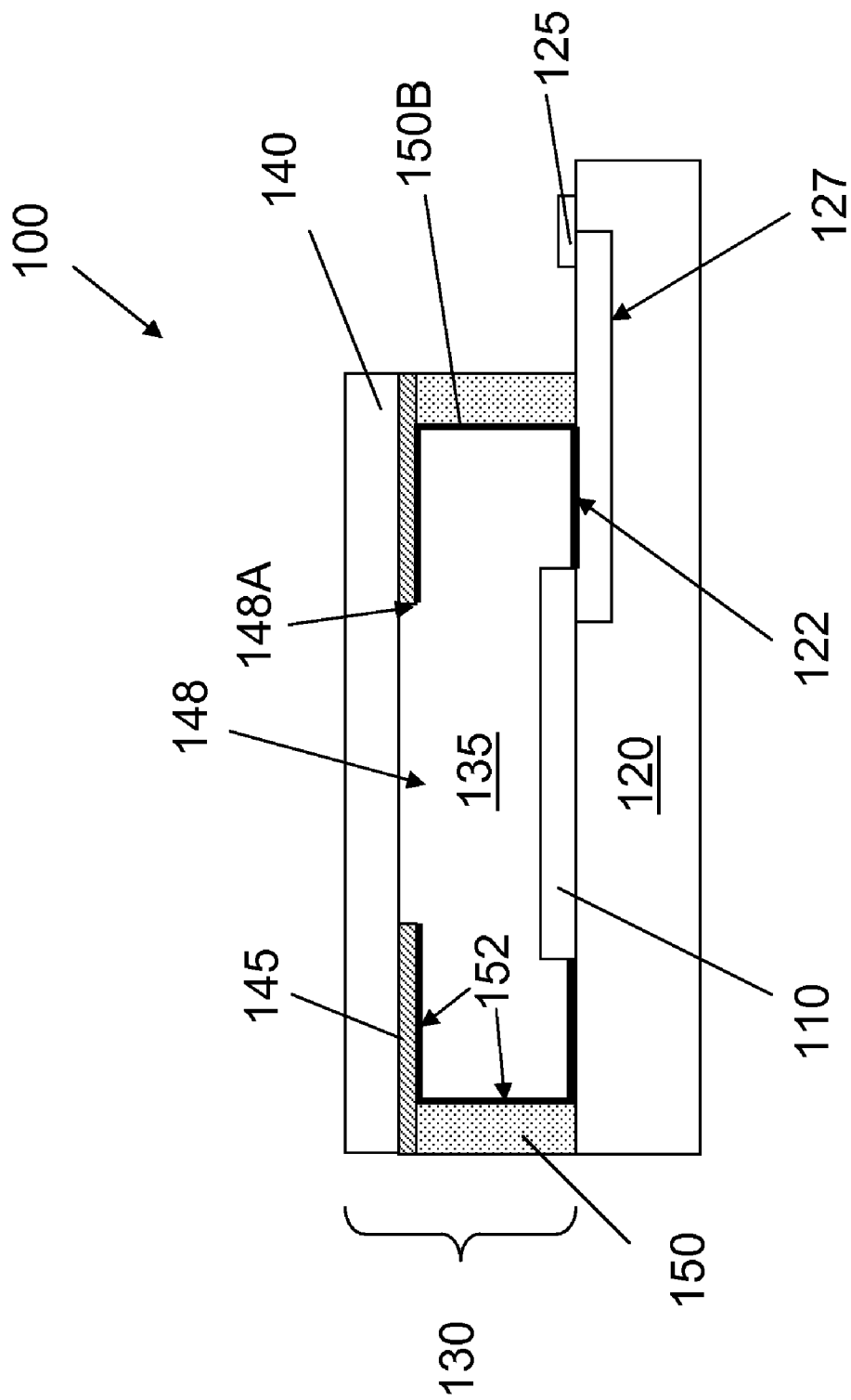
FIG. 1A is a schematic cross-sectional view of a spatial light modulator encapsulated in a chamber.
Figure 1B:
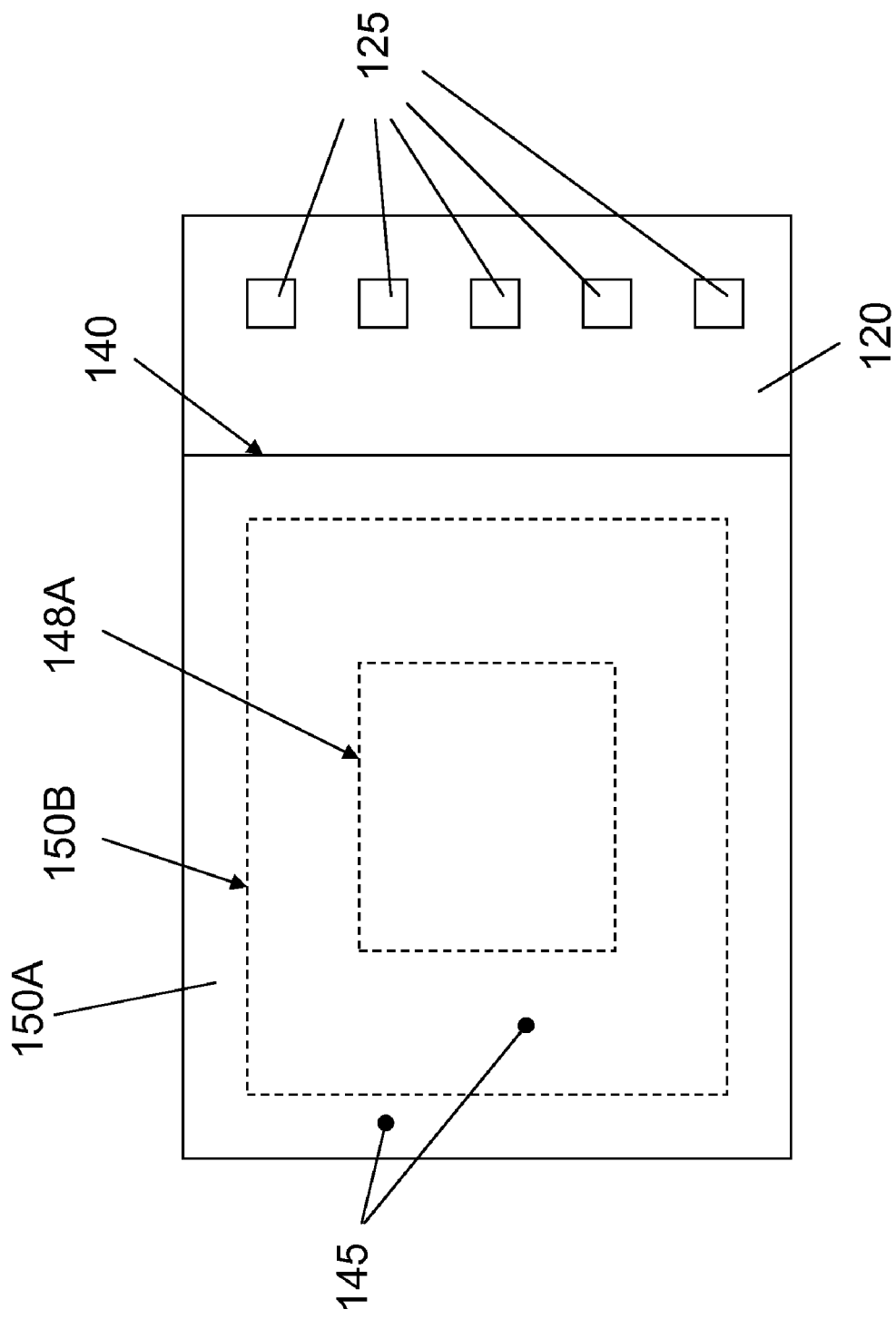
FIG. 1B is a schematic top view of the spatial light modulator encapsulated in the chamber shown in FIG. 1A.

Referring to FIGS. 1A and 1B, a packaged spatial light modulator 100 includes a spatial light modulator 110 formed or mounted onto a substrate 120. The spatial light modulator 110 can be mounted on the substrate 120 by wire bonding or flip-chip bonding. The spatial light modulator 110 can also be formed in one or more layers on a wafer. The substrate 120 can include an electric circuit 127 that electrically connects the spatial light modulator 110 to electric contacts 125 (outside of a chamber 135). The electric contacts 125 allow the spatial light modulator 110 to receive external electric signals or to output electric signals. The electric circuits 127 can, for example, include conductor-metal-oxide semiconductor (CMOS) transistors.

The spatial light modulator 110 is encapsulated by an encapsulation device 130 in a chamber 135. The encapsulation device 130 can include an encapsulation cover 140 that can be made of a material that is transparent to visible, UV, or IR light. An opaque aperture layer 145 can be formed on the lower surface of an encapsulation cover 120. The aperture layer 145 can be made of an opaque material, such as a metal oxide or carbide, for example, chromium oxide. The lower surface of the aperture layer 145 can be coated with a layer 152 of a light absorbing material. An aperture 148 in the opaque aperture layer 145 above the spatial light modulator 110 defines a transparent window for optical communications between the spatial light modulator 110 and outside of the chamber 135. The aperture 148 is defined by aperture boundary 148A.

The encapsulation device 130 can also include spacer walls 150 that are connected to the aperture layer 145 of the encapsulation cover 140 and to the substrate 120. The spacer walls 150 include internal surfaces 150B facing the spatial light modulator 100. For example, the spacer walls 150 can be sealed to the substrate 120 by a polymer adhesive or bonded to the substrate 120 by plasma in the areas 150A (the contact areas between the spacer walls 150 and the encapsulation cover 140 or the substrate 120). The spacer walls 150 can be made of an inorganic material, such as glass. The height of the spacer walls 140 can be about 0.2 to 2.0 microns, or 0.5 to 1 micron. The encapsulation cover 140 can optionally include antireflective coatings on the upper or the lower surfaces.

The surfaces of the spacer walls 150 inside the chamber 135 are also coated by a layer 152 of a light absorbing material. Optionally, an outside surface of the spacer walls 150 can also be coated by a layer of light absorbing material. In some embodiments, the light absorbing material absorbs light more efficiently than the aperture layer 145. The upper surfaces of the substrate 120 that is outside of the spatial light modulator 110 and inside the chamber 135 are also coated with a layer 122 of a light absorbing material, as shown in FIG. 1A. The light absorbing materials on the layer 122, the layer 152, and the aperture layer 145 can include for example a zirconium compound such as zirconium oxide or zirconium nitride.

Figure 2A:
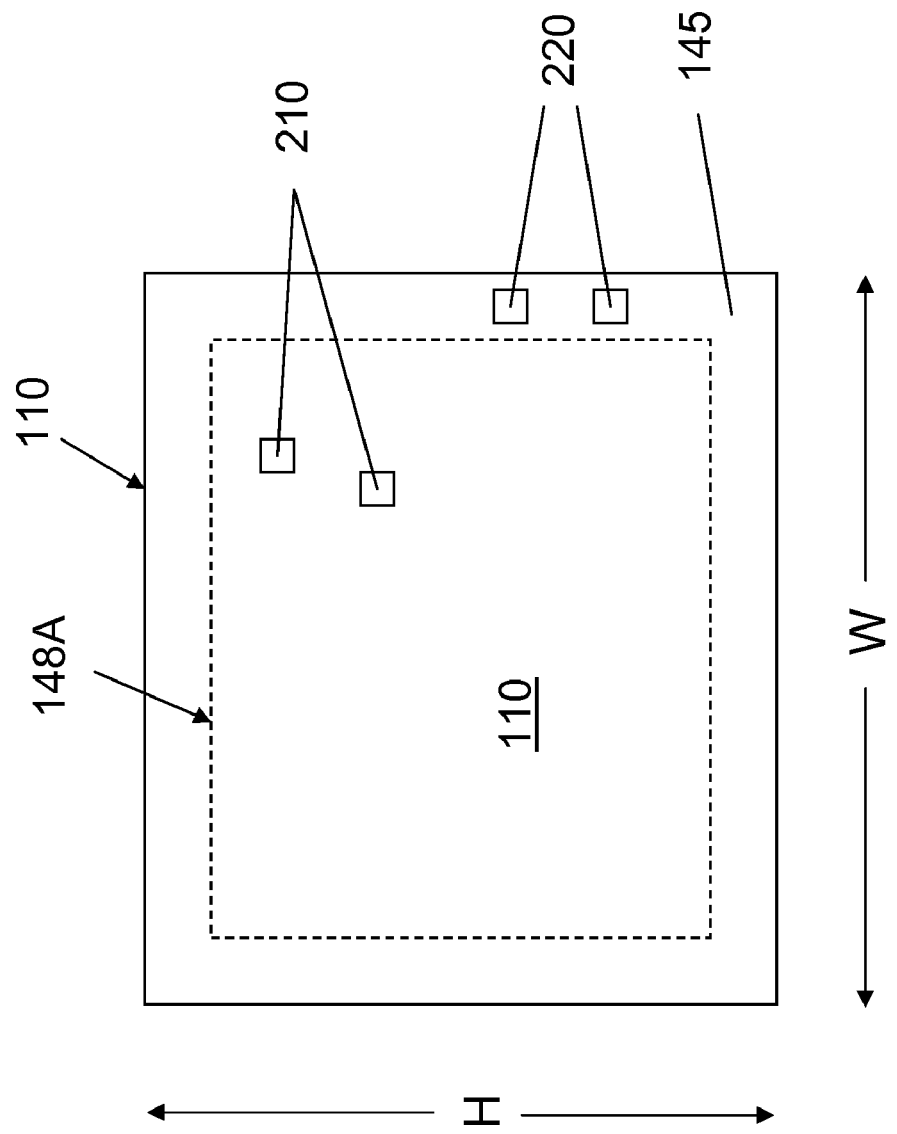
FIG. 2A is a schematic of an enlarged top view of the spatial light modulator including an array of pixel cells each including a micro mirror.

Referring to FIG. 2A, the spatial light modulator 110 can include a plurality of pixel cells 210, 220 that can be distributed in an array that is characterized by two lateral dimensions "W" and "H" (only a few pixel cells are shown for the sake of simplicity). Some pixel cells 210 are under the aperture 148 defined by the aperture boundary 148A. The pixel cells 210 are thus under the window defined by the aperture 148 and can easily receive or output optical signals from or to the outside of the chamber 135.

In some embodiments, some other pixel cells 220 in the spatial light modulator 110 are positioned under the aperture layer 145. The pixel cells 220 are not used for optical communications or light modulations during device operation. The pixel cells 220 can be referred as dummy pixel cells. One purpose for the dummy pixel cells is to overcome possible registration error between the aperture 148 and the spatial light modulator 110. When an encapsulation device 130 is bonded to the substrate 120, small alignment errors may occur in the relative lateral positions between the spatial light modulator 110 and the aperture 148. If the active area of the spatial light modulator 110 is made exactly same size as that of the aperture 148, a small lateral misalignment between the spatial light modulator 110 and the aperture 148 can produce an inactive area inside the aperture 148, that is, certain areas under the aperture 148 may not include pixel cells for optical communications such as spatial light modulations. The array of the pixel cells 210, 220 in the spatial light modulator 110 is therefore made larger than the aperture 148 to ensure the pixel cells 210, 220 fill the area within the aperture boundary 148 despite potential alignment errors. In other words, at least one of the lateral dimensions "W" and "H" of the array of pixel cells 210 and 220 is wider than the corresponding width of the opening 148.

Figure 2B:
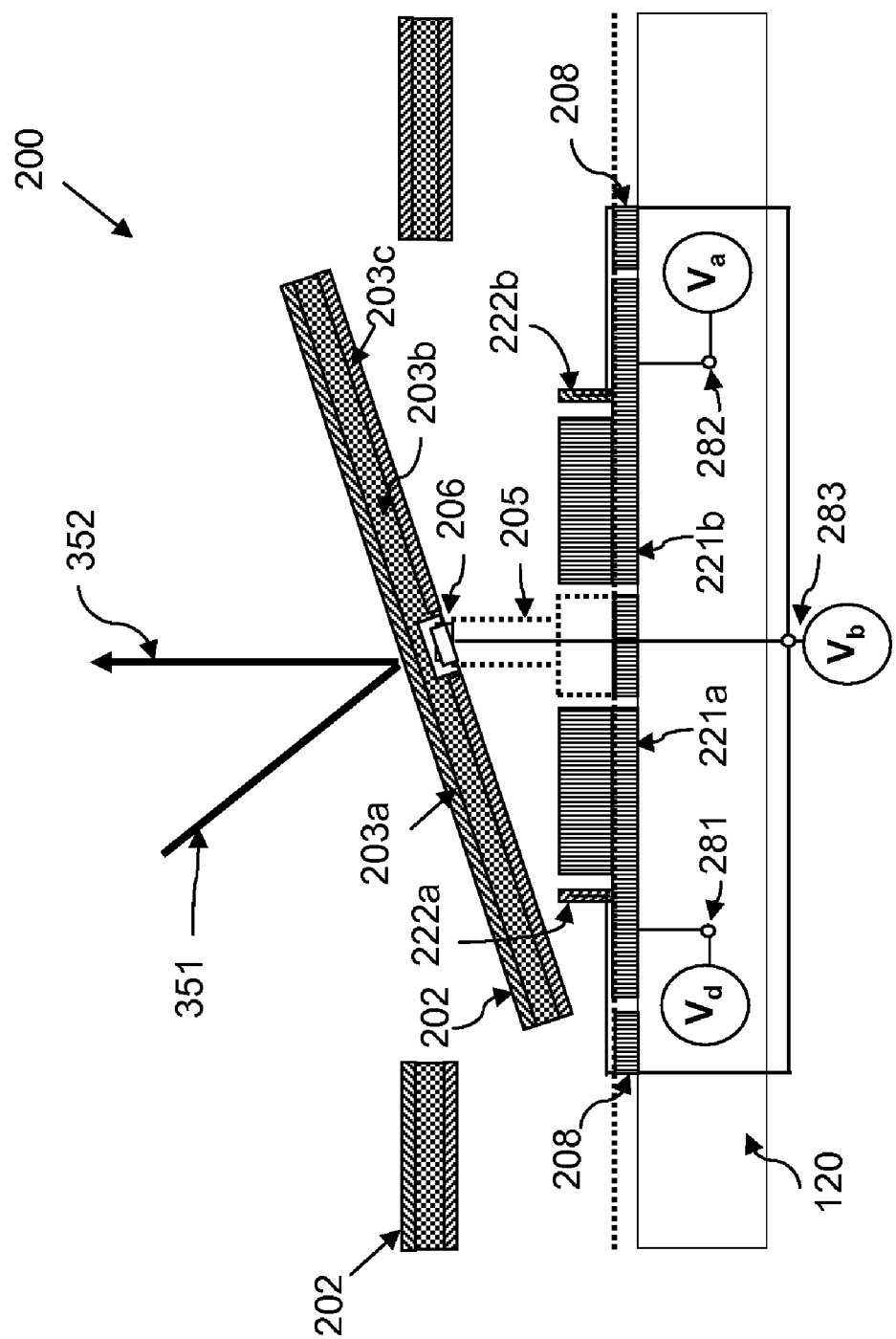
FIG. 2B is a cross-sectional view of an exemplary micro mirror in the spatial light modulator of FIG. 2A.

Referring to FIG. 2B, a pixel cell 210 or 220 can include a tiltable micro mirror 200. The tiltable micro mirror 200 can include a mirror plate 202 that includes a flat reflective upper layer 203a, a middle layer 203b that provides the mechanical strength for the mirror plate, and a bottom layer 203c. The upper layer 203a can be formed of a reflective material such as aluminum, silver, or gold. The layer thickness can be in the range of between about 200 and 1000 angstroms, such as about 600 angstroms. The middle layer 203b can be made of a silicon based material, for example, amorphous silicon, typically about 2000 to 5000 angstroms in thickness. The bottom layer 203c can be made of an electrically conductive material that allows the electric potential of the bottom layer 203c to be controlled relative to the step electrodes 221a or 221b. The bottom layer 203c can be made of titanium and have a thickness in the range of about 200 to 1000 angstroms.

A hinge 206 is connected with the bottom layer 203c (the connections are out of plane of view and are thus not shown in FIG. 2B). The hinge 206 is supported by a hinge post 205 that is rigidly connected to the substrate 120. The mirror plate 202 can include two hinges 206 connected to the bottom layer 203c. The two hinges 206 define an axis about which the mirror plate 202 can be tilted. The hinges 206 can extend into cavities in the lower portion of mirror plate 202. For ease of manufacturing, the hinge 206 can be fabricated as part of the bottom layer 203c.

Step electrodes 221a and 221b, landing tips 222a and 222b, and a support frame 208 can also be fabricated over the substrate 120. The heights of the step electrodes 221a and 221b can be in the range from between about 0.2 microns and 3 microns. The step electrode 221a is electrically connected to an electrode 281 whose voltage Vd can be externally controlled. Similarly, the step electrode 221b is electrically connected with an electrode 282 whose voltage Va can also be externally controlled. The electric potential of the bottom layer 203c of the mirror plate 202 can be controlled by an electrode 283 at potential Vb.

Bipolar electric pulses can individually be applied to the electrodes 281, 282, and 283. Electrostatic forces can be produced on the mirror plate 202 when electric potential differences are created between the bottom layer 203c on the mirror plate 202 and the step electrodes 221a or 221b. An imbalance between the electrostatic forces on the two sides of the mirror plate 202 causes the mirror plate 202 to tilt from one orientation to another.

The landing tips 222a and 222b can have a same height as that of a second step in the step electrodes 221a and 221b for manufacturing simplicity. The landing tips 222a and 222b provide a gentle mechanical stop for the mirror plate 202 after each tilt movement. The landing tips 222a and 222b can also stop the mirror plate 202 at a precise angle. Additionally, the landing tips 222a and 222b can store elastic strain energy when they are deformed by electrostatic forces and convert the elastic strain energy to kinetic energy to push away the mirror plate 202 when the electrostatic forces are removed. The push-back on the mirror plate 202 can help separate the mirror plate 202 and the landing tips 222a and 222b. Alternatively, the micro mirror 200 can be formed without landing tips 222a and 222b.

Details about the structures and operations of micro mirrors are disclosed for example in commonly assigned U.S. Pat. No. 7,167,298, titled "High contrast spatial light modulator and method" and U.S. patent application Ser. No. 11/564,040, entitled "Simplified manufacturing process for micro mirrors", filed Nov. 28, 2006, the content of which are incorporated herein by reference.

Figure 3B:
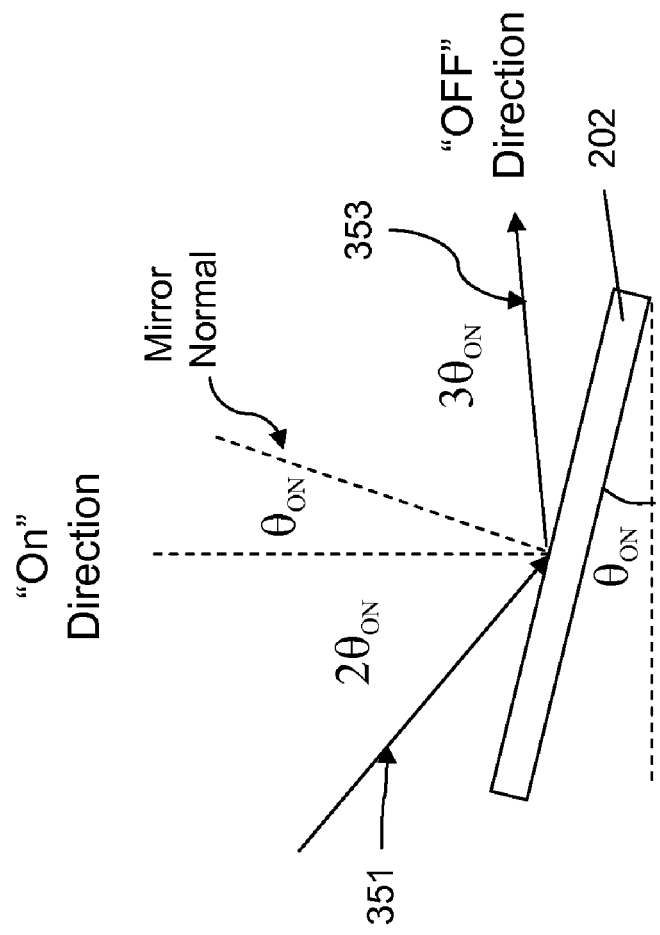
FIGS. 3A and 3B illustrate directions of incident light and reflected light when a micro mirror plate in a pixel cell of a spatial light modulator is tilted to an "on" and an "off" direction respectively.
Figure 3A:
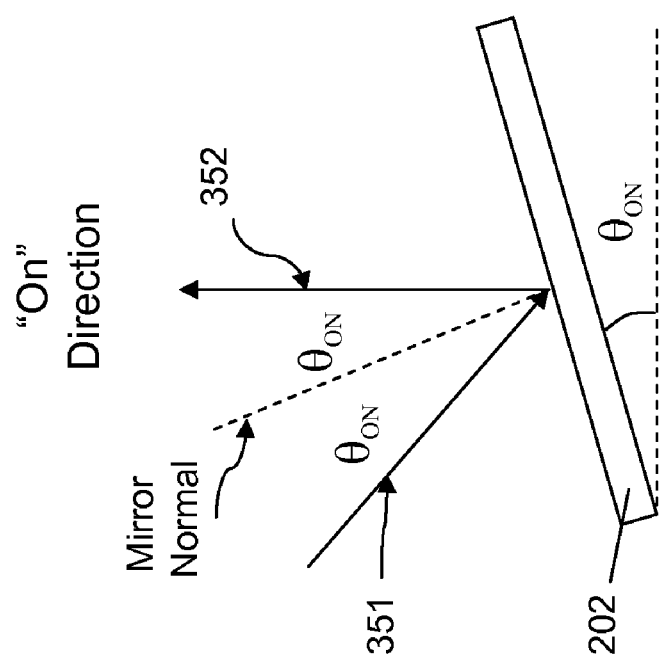

Referring to FIGS. 3A and 3B, the un-tilted position for the mirror plate 202 is typically the horizontal direction parallel to the upper surface of the substrate 120. The mirror plate 202 can be tilted by a tilt angle $\theta_{on}$ from the un-tilted position to an "on" position. The flat reflective upper layer of the mirror plate 202 can reflect the incident light 351 to produce the light 352 along the "on" direction. Since the incident angle (i.e., the angle between the incident light 330 and the mirror normal direction) and the reflection angle (i.e. the angle between the reflected light 340 and the mirror normal direction) are the same, the incident light 330 and the reflected light 340 form an angle $2\theta_{on}$ that is twice as large as the tilt angle $\theta_{on}$ of the mirror plate 202. The "on" direction is typically configured to be perpendicular to the substrate 120.

The mirror plate 202 can be symmetrically tilted in an opposite direction to an "off" position. The mirror plate 202 can reflect the incident light 351 to form reflected light 353 traveling in the "off" direction. Because the incident angle for the incident light 330 is $3\theta_{on}$, the reflection angle should also be $3\theta_{on}$. Thus the angle between the light 352 and the light 353 is $4\theta_{on}$, four times as large as the tilt angle $\theta_{on}$ of the mirror plate 202. Typically, the tiltable micro mirror 200 is designed to produce the light 353 that travels substantially in the lateral direction.

Figure 4:
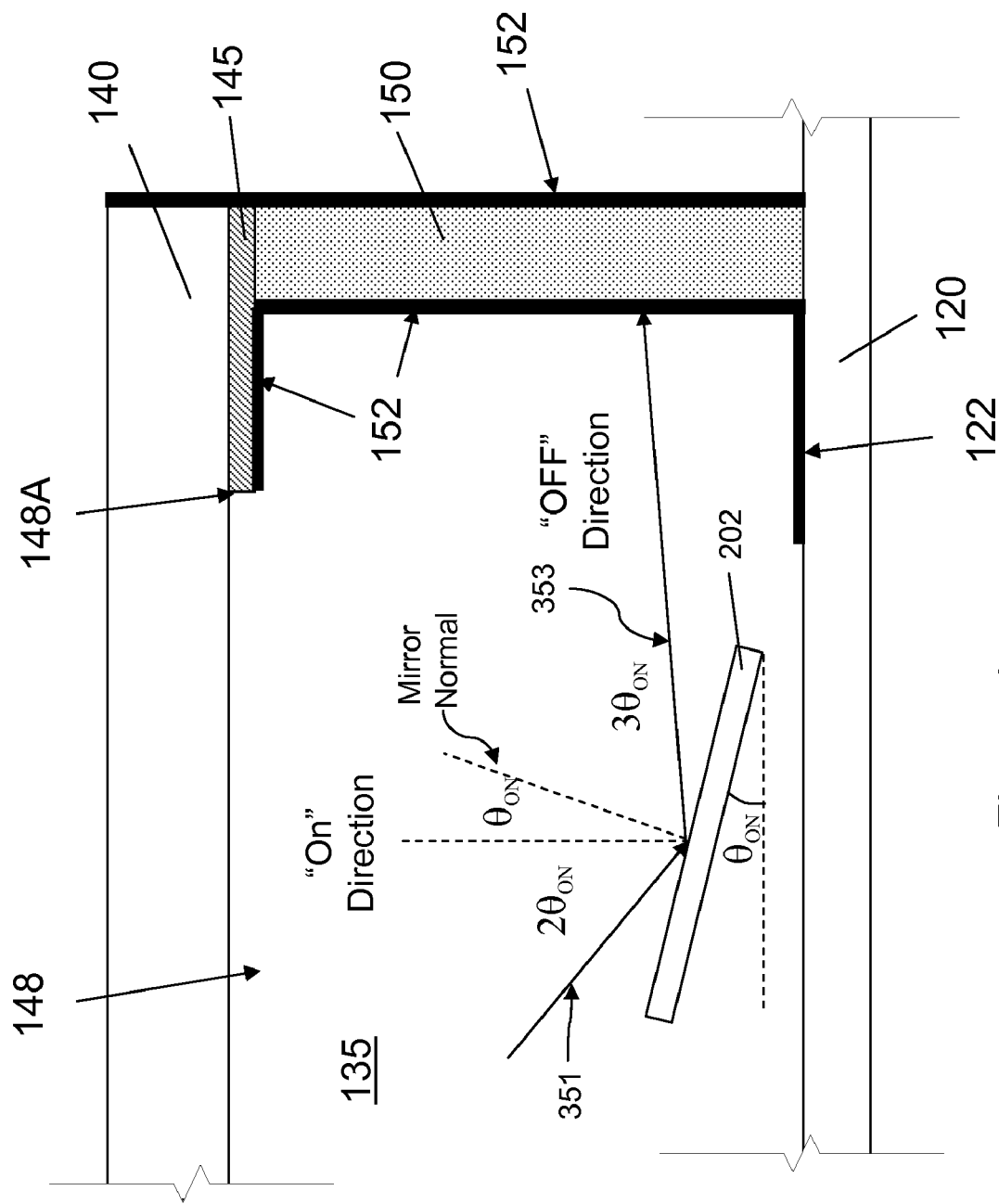
FIG. 4 is a schematic diagram showing incident light and reflected light in the chamber when a micro mirror plate in a pixel cell of a spatial light modulator is tilted to an "off" direction.

Referring to FIG. 4, the light 353 reflected by the mirror plate 202 can travel in the "off" direction inside the chamber 135 (FIG. 4 illustrates only a single mirror plate for clarity; all of the mirror plates of the spatial light modulator would similarly be positioned in the chamber 135). The light 353 can impinge on the layer 152 of light absorbing material coated on the internal surfaces of the spacer walls 150 and be absorbed by the light absorbing material in the layer 152. Other unwanted light in the chamber 135 can include light scattered by the surfaces and objects in the chamber 135. The unwanted light can also be absorbed by the layer 122 on the surface of the substrate 120 and the aperture layer 145 on the lower surface of the encapsulation cover 140. When the mirror plate 202 is tilted to an "off" direction, it is desirable that no light can travel outside of the chamber 135 through the aperture 148. An important measure for the performance of the spatial light modulator 110 is the ratio of the output light intensities when the mirror plate is tilted to the "on" and the "off" directions. The effective absorption of light 353 and other unwanted light in the chamber 135 in the disclosed system can significantly reduce the unwanted light exiting the aperture 148 when the mirror pale is tilted to an "off" position. The contrast and the performance of the spatial light modulator 110 can thus be improved.

Figure 5:
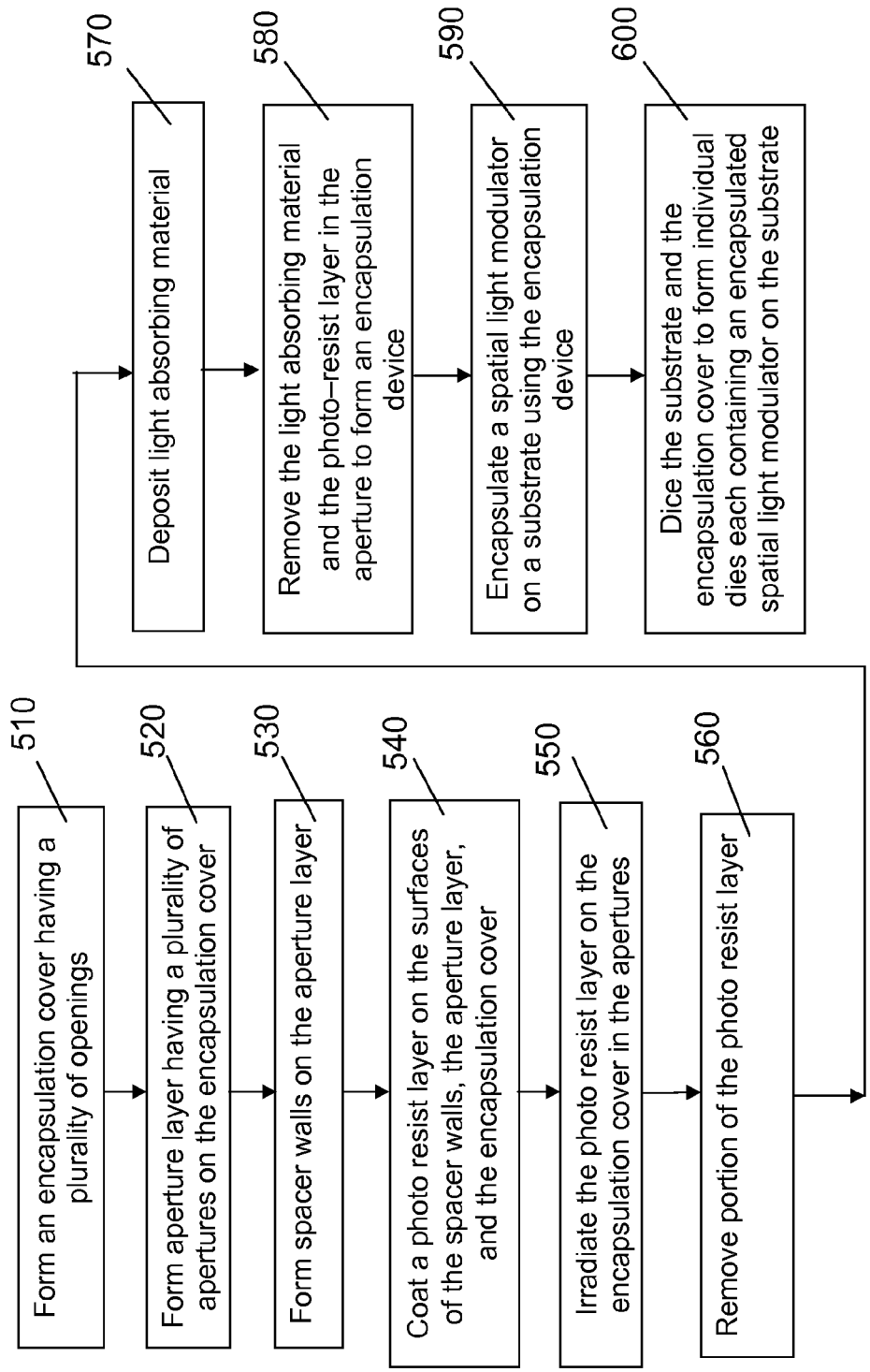
FIG. 5 is a flowchart showing the steps of fabricating an encapsulation device and encapsulating a spatial light modulator on a substrate using the encapsulation device.

FIG. 5 is a flowchart showing the steps of fabricating an encapsulation device 130 and encapsulating a spatial light modulator 110 on a substrate 120 using the encapsulation device 130. Referring to FIGS. 6 and 7A, an encapsulation cover 140 having a plurality of openings 315 is first provided (step 510). As described above, the encapsulation cover 140 is made of a transparent material. Each opening 315 between chambers 135 to be defined by the intact portions of the cover 140. The openings 315 are provided for accessing the electric contacts 125 on the substrate 120 after the spatial light modulators 110 are encapsulated in chambers 135.

Figure 7C:
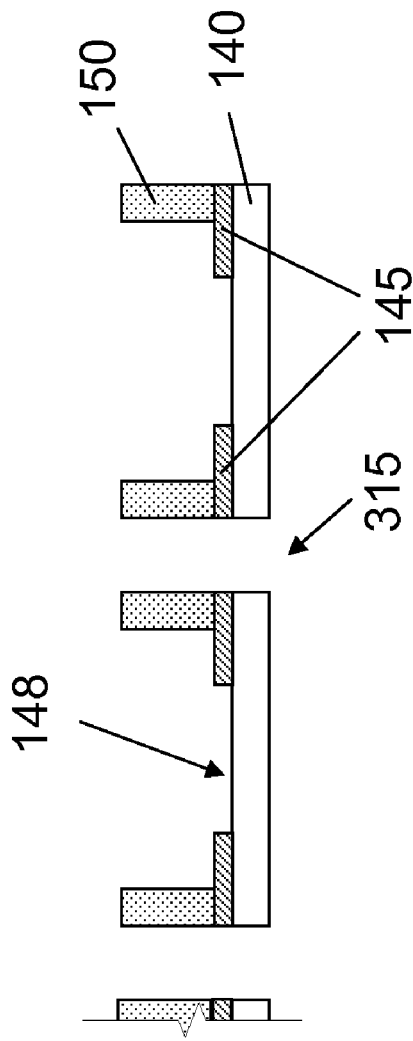

An opaque aperture layer 145 is next formed and patterned on a surface of the encapsulation cover 120 (FIG. 7B, step 520). The patterned aperture layer 145 defines a plurality of apertures 148 each associated with an opening 315 (and a chamber 135 to be formed). A plurality of spacer walls 150 are next formed on the patterned aperture layer 145 (FIG. 7C, step 530). The spacer walls can be adjacent to the openings and surrounding the apertures 148. Examples of the materials for the spacer walls 150 can include a metal such as nickel, and copper. The spacer walls 150 can be formed by first forming a conductive layer on the encapsulation cover 120. A mask layer can then be formed on the conductive layer. The mask layer can have openings in the area where the spacer walls are to be built. The spacer walls are then formed in the openings by electrochemical plating. The spacer walls 150 can be formed by successive formation of a plurality of layers. Details about forming spacer walls using electrochemical plating are disclosed in commonly assigned pending U.S. Ser. No. 11/680,600, entitled "Fabricating tall micro structure", filed Feb. 28, 2007, this disclosure of which is incorporated herein by reference.

Figure 7D:
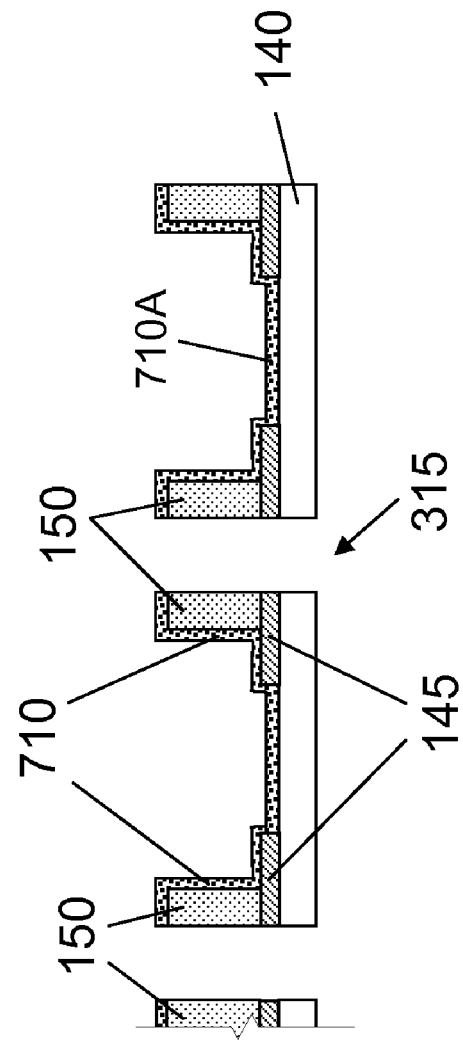
Figure 7E:
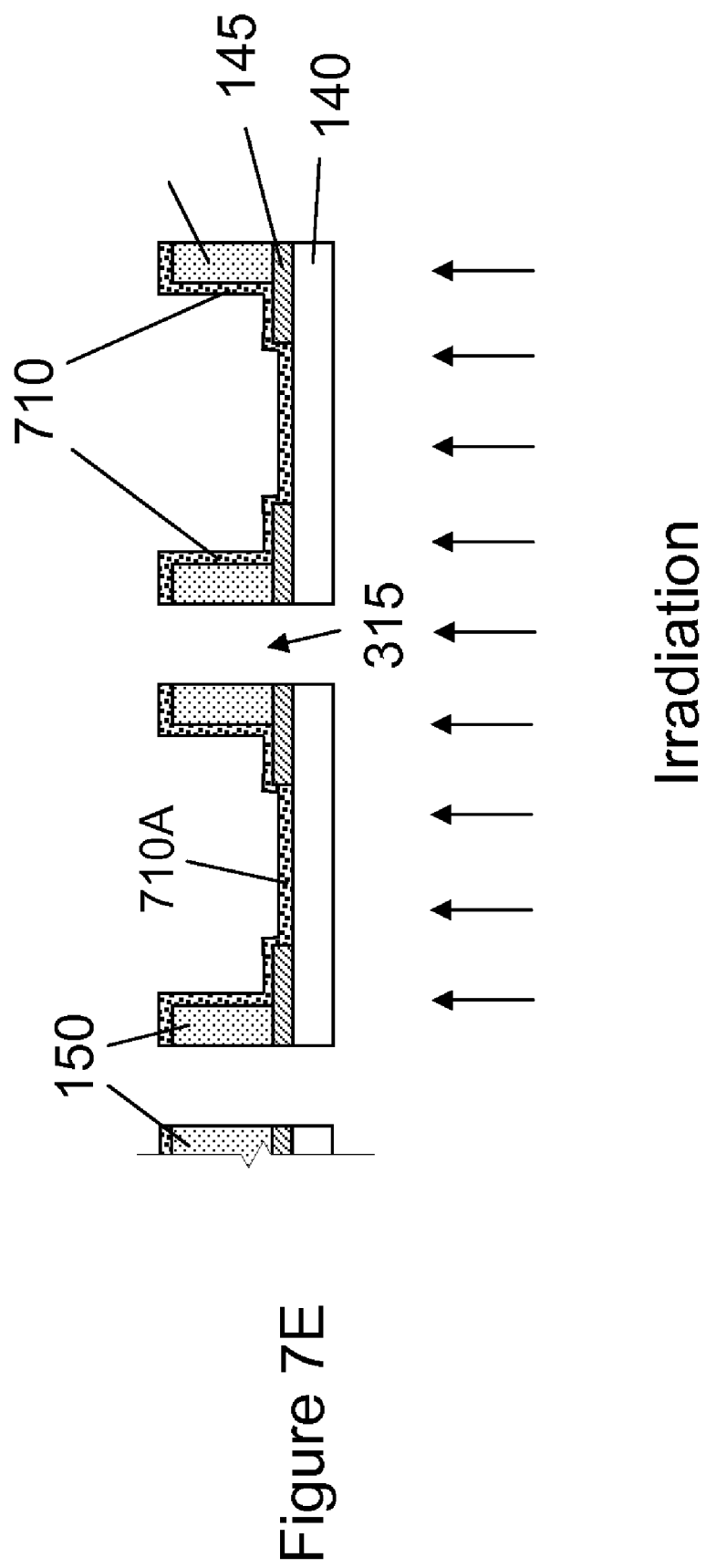
Figure 7F:
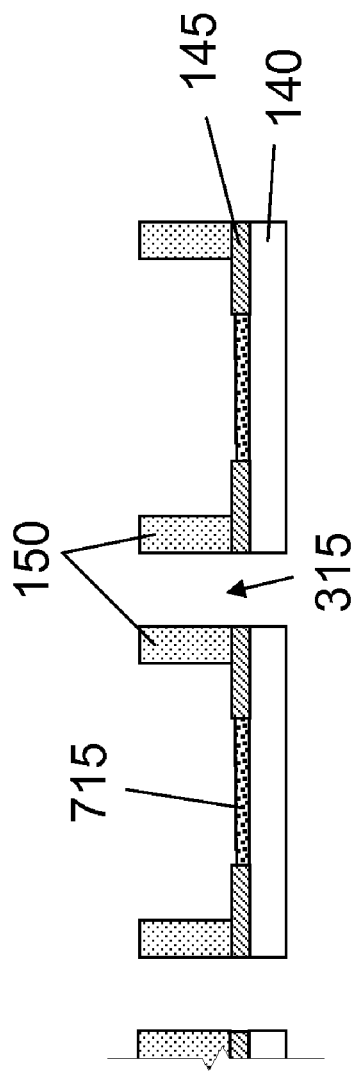

A negative photo resist is next spin-coated on the spacer walls 150 and the aperture layer 145, and the portion of the encapsulation cover 120 in the apertures 148 (FIG. 7D, step 540). A photo resist layer 710 is formed on the surfaces of the spacer walls 150 and the aperture layer 145. A portion 710A of the photo resist layer is formed within the apertures 148. Photon irradiation is next applied from the side of the encapsulation cover 120 that is opposite to the photo resist layer 710 (FIG. 7E, step 550). Since the aperture layer 145 is opaque and the encapsulation cover 120 is transparent, only the portion 710A of the photo resist layer 710 in the aperture 148 is exposed to the photon irradiation. The photo resist layer 710A is subsequently cured by baking. The photo resist layer 710 is then removed by a developer while a cured photo resist layer 715 remains on the portion of the encapsulation cover 120 that is within the apertures 148 (FIG. 7F, step 560).

Figure 7G:
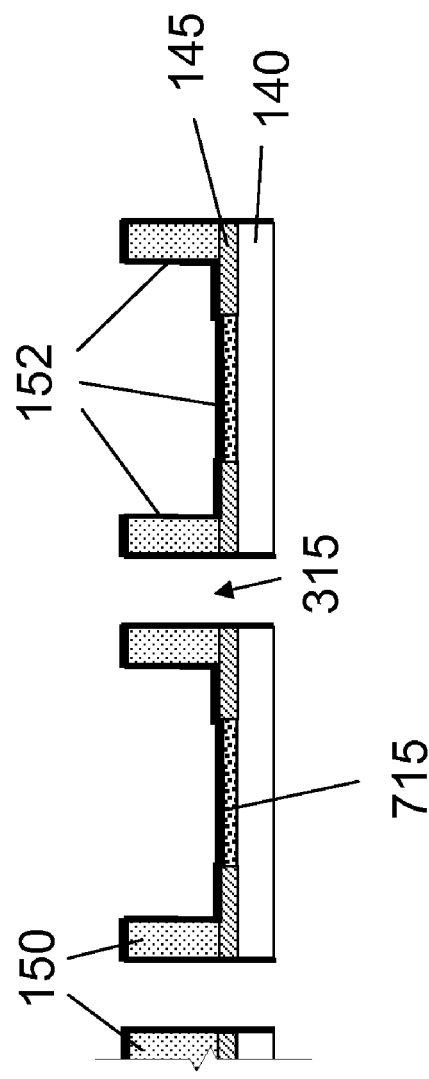
Figure 7H:
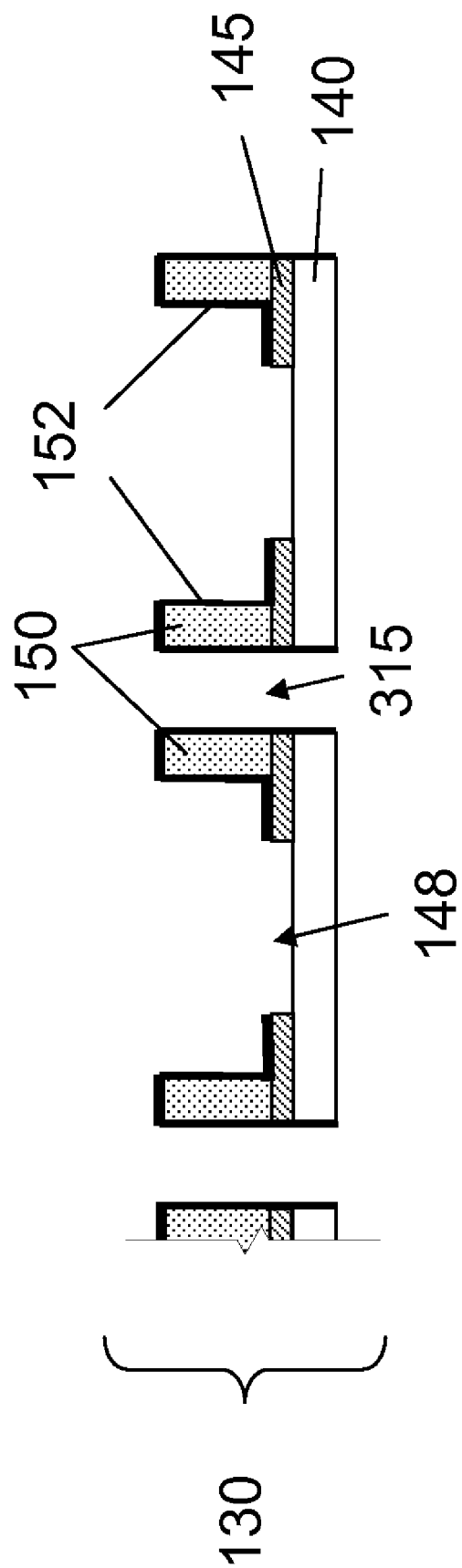

A layer of light absorbing material is next deposited on the surfaces of the spacer walls 150 and the aperture layer 145, and the cured photo resist layer 715 (FIG. 7G, step 570). The light absorbing material can include a zirconium compound such as zirconium oxide and zirconium nitride. The light absorbing material can alternatively include amorphous carbon. The light absorbing material can be anisotropically deposited using chemical vapor deposition (CVD). An encapsulation device 130 is finally formed by lifting off the cured photo resist layer 715 and the portion of the light absorbing material 152 on the cured photo resist layer 715 (FIG. 7H, step 580).

Figure 7I:
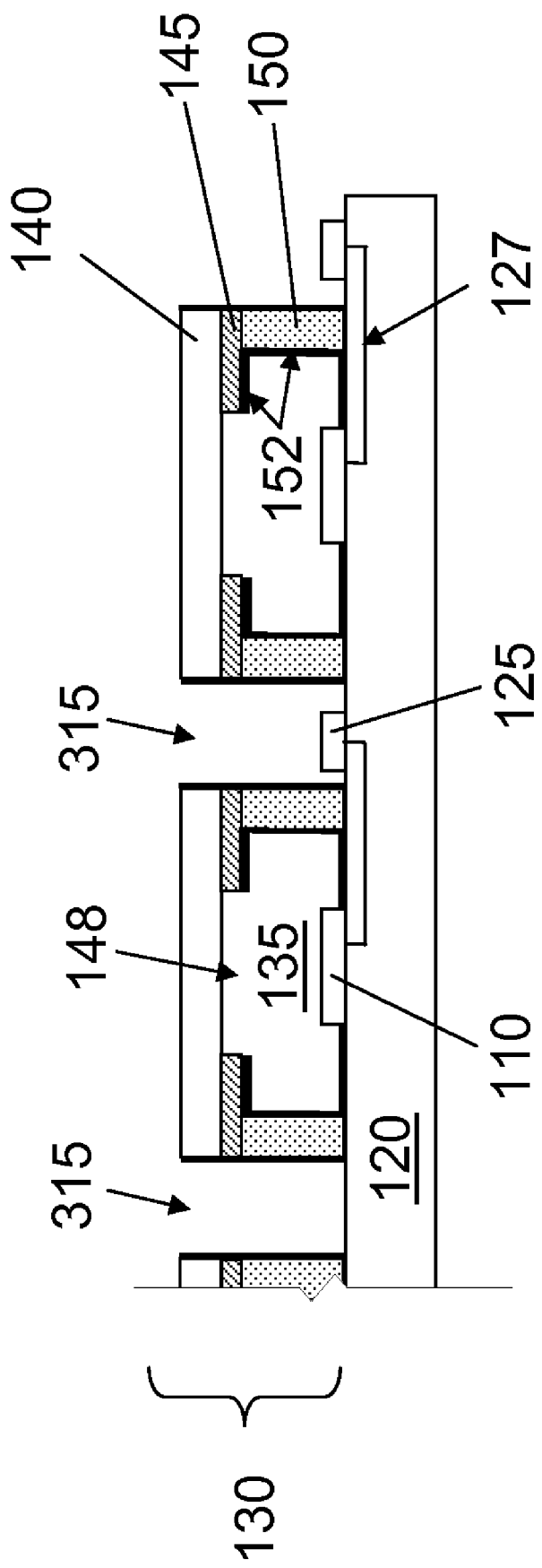

The encapsulation device 130 can then be used to encapsulate a plurality of spatial light modulators 110 on substrate 120 (FIG. 7I, step 590). The surfaces of the spacer walls 150 are sealed to the upper surface of the substrate 120 with a polymer adhesive, such as epoxy or bonded to the upper surface of the substrate 120 by plasma bonding. A plurality of chambers 135 are thereby formed, each encapsulating one or more spatial light modulators 110. One or more electric contacts 125 are positioned on the substrate 120 in the opening 315 next to each chamber 135. The substrate 120 and the encapsulation cover 140 can then by diced to form individual dies each containing an encapsulated spatial light modulator 110 (step 600).

The above disclosed methods and devices may include one or more of the following advantages. The disclosed spatial light modulators can have improved optical performances. Unwanted light may be absorbed in a micro chamber that encapsulates the spatial light modulator. The optical noise in the output optical signal can therefore be reduced. The contrast between an "on" state and an "off" state of the spatial light modulator may also be increased. The specification also discloses manufacturing processes for encapsulation devices that include light absorbing components that can absorb the unwanted light in the chambers. Furthermore, a plurality of spatial light modulators on a substrate can be encapsulated in a common process. The manufacturing efficiency is thus improved.

It is understood that the disclosed systems and methods are compatible with other light absorbing materials and other processes for introducing the light-absorbing materials in the chambers. The encapsulation cover and the spacer walls can be made of different materials and formed by different processes. The spacer walls can be connected to the encapsulation cover and the substrate by different sealing or bonding techniques. The spatial light modulators compatible with the disclosed system and methods can include many optical devices other than tiltable micro mirrors. The tiltable mirrors can be tilted to more positions than the disclosed on and off position. The tiltable mirrors may not include mechanical stops for stopping the tilt movement of the mirror plates. The positions of the tiltable mirrors may be defined by balances between electrostatic forces and elastic forces. The relative positions, form factors, dimensions, and shapes of the chambers, the spatial light modulators, and the electric contact can also vary without deviating from the present application.

What is claimed is:

1. An encapsulated spatial light modulator, comprising:
   a spatial light modulator on a substrate within a chamber;
   an encapsulation cover in part defining the chamber;
   a spacer wall between the substrate and the encapsulation cover, wherein the spacer wall has an inner surface adjacent to the spatial light modulator; and
   a first light absorbing material on the inner surface of the spacer wall, the light absorbing material configured to absorb light in the chamber, wherein the first light absorbing material comprises a zirconium compound.

2. The encapsulated spatial light modulator of claim 1, wherein the first light absorbing material comprises zirconium oxide or zirconium nitride.

3. An encapsulated spatial light modulator, comprising:
   a spatial light modulator on a substrate within a chamber;
   an encapsulation cover in part defining the chamber;
   a spacer wall between the substrate and the encapsulation cover, wherein the spacer wall has an inner surface adjacent to the spatial light modulator and comprises a metallic material; and
   a first light absorbing material on the inner surface of the spacer wall, the light absorbing material configured to absorb light in the chamber.

4. An encapsulated spatial light modulator, comprising:
   a spatial light modulator on a substrate within a chamber;
   an encapsulation cover in part defining the chamber;
   a spacer wall between the substrate and the encapsulation cover, wherein the spacer wall has an inner surface adjacent to the spatial light modulator and the spacer wall defines a cavity height between the substrate and the encapsulation cover, and the cavity height is between about 0.2 and 2.0 microns; and
   a first light absorbing material on the inner surface of the spacer wall, the light absorbing material configured to absorb light in the chamber.

5. The encapsulated spatial light modulator of claim 4, wherein the encapsulation cover is transparent to visible, UV, or IR light.

6. The encapsulated spatial light modulator of claim 4, further comprising an aperture layer on a surface of the encapsulation cover, wherein the aperture layer comprises an opening over the spatial light modulator.

7. The encapsulated spatial light modulator of claim 6, wherein the aperture layer comprises a chromium compound.

8. The encapsulated spatial light modulator of claim 6, wherein the aperture layer is inside the chamber.

9. The encapsulated spatial light modulator of claim 8, further comprising a second light absorbing material on a surface of the aperture layer, wherein the second light absorbing material is configured to absorb light in the chamber.

10. The encapsulated spatial light modulator of claim 9, wherein the second light absorbing material comprises a chromium compound or a zirconium compound.

11. The encapsulated spatial light modulator of claim 4, further comprising a third light absorbing material on a surface of the substrate, wherein the third light absorbing material is configured to absorb unwanted light in the chamber.

12. The encapsulated spatial light modulator of claim 11, wherein the third light absorbing material comprises a zirconium compound.

13. The encapsulated spatial light modulator of claim 11, wherein the third light absorbing material is on a portion of the surface of the substrate not covered by the spatial light modulator.

14. The encapsulated spatial light modulator of claim 4, wherein the spacer wall is sealed to the encapsulation cover or the substrate with an adhesive.

15. The encapsulated spatial light modulator of claim 4, wherein the spacer wall is bonded to the encapsulation cover or the substrate.

16. The encapsulated spatial light modulator of claim 4, wherein the cavity height is between about 0.5 and 1 micron.

17. The encapsulated spatial light modulator of claim 4, wherein the spatial light modulator comprises a tiltable mirror configured to tilt to an on position and an off position.

18. The encapsulated spatial light modulator of claim 17, wherein the tiltable mirror is configured to reflect light out of the chamber when the tiltable mirror is at the on position.

19. The encapsulated spatial light modulator of claim 17, wherein the encapsulation cover is substantially parallel to a surface of the substrate and the mirror reflects light in an on direction when the mirror is at the on position and the on direction is substantially perpendicular to the encapsulation cover.

20. The encapsulated spatial light modulator of claim 17, wherein the tiltable mirror is configured to reflect light toward the first light absorbing material when the tiltable mirror is at the off position, wherein reflected light is absorbed by the first light absorbing material.

21. The encapsulated spatial light modulator of claim 4, further comprising one or more electric contacts on the substrate, where the one or more electric contacts are configured to send electric signals to or receive electric signals from the spatial light modulator.

22. The encapsulated spatial light modulator of claim 21, wherein the one or more electric contacts are positioned outside of the chamber.

23. The encapsulated spatial light modulator of claim 4, further comprising an aperture layer on a surface of the encapsulation cover, wherein the spatial light modulator comprises an array of tiltable mirrors and the array is characterized by a first lateral dimension and a second lateral dimension substantially orthogonal to the first dimension, and wherein the aperture layer comprises an opening above the array of tiltable mirrors.

24. The encapsulated spatial light modulator of claim 23, wherein the first lateral dimension of the array of tiltable mirrors is wider than a corresponding dimension of the opening in the aperture layer.

25. A method for operating an array of tiltable mirrors encapsulated in a chamber on a substrate, comprising:
    tilting at least one of the tiltable mirrors to an on position;
    reflecting a first packet of incident light off of the tiltable mirror to produce a first reflected light in the on position;
    transmitting the first reflected light out of the chamber, wherein the chamber comprises an encapsulation cover and a spacer wall between the substrate and the encapsulation cover; the spacer wall causing there to be a distance of 0.2 to 2.0 microns between the substrate and the encapsulation cover;
    tilting the tiltable mirror to an off position;
    reflecting a second packet of incident light off of the tiltable mirror to produce a second reflected light in the off position; and
    absorbing the second reflected light by a first light absorbing material on a surface of the spacer wall in the chamber.

26. The method of claim 25, wherein a second reflected light exits the chamber through an opening in an aperture layer on the encapsulation cover.

27. A method for operating an array of tiltable mirrors encapsulated in a chamber on a substrate, comprising:
    tilting at least one of the tiltable mirrors to an on position;
    reflecting a first packet of incident light off of the tiltable mirror to produce a first reflected light in the on position;
    transmitting the first reflected light out of the chamber, wherein the chamber comprises an encapsulation cover and a spacer wall between the substrate and the encapsulation cover;
    tilting the tiltable mirror to an off position;
    reflecting a second packet of incident light off of the tiltable mirror to produce a second reflected light in the off position wherein the second reflected light exits the chamber through an opening in an aperture layer on the encapsulation cover; and
    absorbing the second reflected light by a first light absorbing material on a surface of the spacer wall in the chamber and absorbing unwanted light by a second light absorbing material on a surface of the aperture layer, wherein the surface of the aperture layer is in the chamber.

28. The method of claim 27, wherein the first light absorbing material or the second light absorbing material comprises a zirconium compound.

29. The method of claim 27, wherein the encapsulation cover is transparent to visible, UV, or IR light.

30. A method for fabricating an encapsulation device for a plurality of spatial light modulators, comprising:
    forming a plurality of openings in an encapsulation cover;
    forming an aperture layer on the encapsulation cover, the aperture layer comprising a plurality of openings;
    forming spacer walls on the encapsulation cover, wherein the step of forming spacer walls comprises:
        forming a conductive layer on the encapsulation cover;
        forming a mask layer on the conductive layer, wherein the mask layer comprises a plurality of openings; and
        electroplating the spacer walls on the conductive layer and in the openings of the mask layer; and
    forming a layer of a first light absorbing material on the spacer walls and the aperture layer, thereby producing an encapsulation device, wherein the first light absorbing material is configured to absorb light in chambers.

31. A method for fabricating an encapsulation device for a plurality of spatial light modulators, comprising:
    forming a plurality of openings in an encapsulation cover;

forming an aperture layer on the encapsulation cover, the aperture layer comprising a plurality of openings;

forming spacer walls on the encapsulation cover, forming a layer of a first light absorbing material on the spacer walls and the aperture layer, thereby producing an encapsulation device, wherein the first light absorbing material is configured to absorb light in the chambers, wherein the step of forming a layer of a first light absorbing material on at least one the spacer walls comprises:

coating a photo resist layer on the spacer walls, the aperture layer, and on a surface of the encapsulation cover that corresponds to the openings in the aperture layer;

irradiating a portion of the photo resist layer that is in the openings of the aperture layer;

removing the photo resist layer on the spacer walls and the aperture layer;

subsequently depositing the first light absorbing material on the spacer walls and the aperture layer, and on the photo resist layer; and removing the photo resist layer on the surface of the encapsulation cover and the first light absorbing material thereon.

32. A method of forming an encapsulated spatial light modulator, comprising:

forming a plurality of openings in an encapsulation cover;

forming an aperture layer on the encapsulation cover, the aperture layer comprising a plurality of openings;

forming spacer walls on the encapsulation cover, forming a layer of a first light absorbing material on the spacer walls and the aperture layer, thereby producing an encapsulation device, wherein the first light absorbing material is configured to absorb light in the chambers, and connecting the spacer walls to a surface of a substrate having a plurality of spatial light modulators to form a plurality of chambers on the substrate with each chamber including at least one spatial light modulator.

33. The method of claim 32, wherein the spacer walls are sealed to the surface of the substrate by an adhesive.

34. The method of claim 32, wherein the spacer walls are bonded to the surface of the substrate by plasma bonding.

35. The method of claim 32, further comprising cuffing a portion of the substrate and a portion of the encapsulation cover to form two or more dies each containing at least one chamber encapsulating one of the spatial light modulators.

* * * * *

UNITED STATES PATENT AND TRADEMARK OFFICE
CERTIFICATE OF CORRECTION

| | | |
|---|---|---|
| PATENT NO. | : 7,538,922 B2 | Page 1 of 1 |
| APPLICATION NO. | : 11/690776 | |
| DATED | : May 26, 2009 | |
| INVENTOR(S) | : Shaoher X. Pan | |

It is certified that error appears in the above-identified patent and that said Letters Patent is hereby corrected as shown below:

Column 11, Line 9 at Claim 31; replace:
"ing material on at least one the spacer walls comprises:" with
-- ing material on at least one of the spacer walls comprises: --

Column 12, Line 20 at Claim 35; replace:
"The method of claim 32, further comprising cuffing a" with
-- The method of claim 32, further comprising cutting a --

Signed and Sealed this

Twenty-first Day of July, 2009

JOHN DOLL
*Acting Director of the United States Patent and Trademark Office*